United States Patent [19]

Nakamura et al.

[11] 3,745,458

[45] July 10, 1973

[54] SYNCHRONOUS DETECTING DEVICE FOR PSK POLYPHASE WAVE

[75] Inventors: Hiroshi Nakamura, Tokyo; Noriyasu Toyonaga, Kawasaki, both of Japan

[73] Assignee: Fujitsu Limited, Kawasaki, Japan

[22] Filed: Aug. 9, 1971

[21] Appl. No.: 170,085

[30] Foreign Application Priority Data

Aug. 10, 1970 Japan ............................... 45/69877

[52] U.S. Cl. ........................ 324/85, 329/112, 178/88

[51] Int. Cl. ......................... G01r 25/00, H03d 3/00

[58] Field of Search .................. 324/83 A, 83 D, 85; 328/133; 329/112; 325/345; 178/88

[56] References Cited

UNITED STATES PATENTS 3,307,105 2/1967 Nevius ................................ 324/85

*Primary Examiner*—Alfred E. Smith

*Attorney*—Curt M. Avery, Herbert L. Lerner et al.

[57] ABSTRACT

A synchronous detecting device for detecting phase shift keyed waves utilized in satellite communications and the like multiplies the PSK signals by 2 in a first plurality of multipliers and multiplies a plurality of reference carriers in a second plurality of multipliers. The multiplied signals are applied to a plurality of phase detectors. The PSK signals and the reference carriers are applied directly to another plurality of phase detectors. The phase detectors produce outputs proportional to the phase differences between the multiplied signals and the multiplied reference carriers whereby n phase detectors discriminate $2^n$ phases.

5 Claims, 14 Drawing Figures

SYNCHRONOUS DETECTING DEVICE FOR PSK POLYPHASE WAVE

The invention relates to a synchronous detecting device. More particularly, the invention relates to a synchronous detecting device for a PSK polyphase wave.

As utilized herein, a PSK wave is a phase shift keyed wave.

In a detecting device of known type, $2^{n-1}$ phase shifters, phase detectors and low pass filters are required to detect a PSK wave of $2^n$ phases. $n$ is a positive integer. Consequently, $2^{n-1}$ outputs are provided. Thus, a conventional synchronous detecting device has the disadvantages that since outputs of $2^{n-1}$ bits are required for discriminating $2^n$ phases, the more the phases, the more the redundancy and useless bits increase at a rapid rate. Since $2^{n-1}$ outputs are provided, $2^{n-1}$ waveform reshaping circuits are required after detection. Since a circuit for converting outputs from $2^{n-1}$ bits to n bits is required, the output logic circuit is complicated.

An object of the invention is to provide a synchronous detecting device which overcomes the disadvantages of known devices.

Another object of our invention is to provide a synchronous detecting device for a PSK polyphase wave which utilizes considerably less equipment than known devices of similar type.

Still another object of the invention is to provide a synchronous detecting device for a PSK wave of $2^n$ phases which discriminates $2^n$ phases by providing n outputs.

A further object of our invention is to provide a synchronous detecting device which discriminates a PSK polyphase wave with efficiency, effectiveness and reliability in operation and which is less expensive in manufacture and operation than similar devices of known type.

In accordance with the invention, the synchronous detecting device for a PSK polyphase wave multiplies a PSK polyphase wave by 2 and multiplies a reference carrier wave by 2. The multiplied PSK wave and the multiplied reference carrier wave are supplied to a plurality of phase detectors whereby $2^n$ phases are discriminated by $n$ outputs.

In accordance with the invention, a synchronous detecting device comprises first input means for supplying PSK polyphase signals. Second input means supplies reference carriers. A first plurality of multipliers coupled in series to the first input means multiplies the PSK signals in sequence by 2. A second plurality of multipliers coupled in series to the second input means multiplies the reference carriers in sequence by 2. The number of multipliers in each of the first and second pluralities of multipliers is equal and each multiplier multiplies an input signal by 2. A first phase detector coupled to the first and second input means detects the phase difference between the PSK signals and the reference carriers. A second phase detector coupled to a first multiplier of each of the first and second pluralities of multipliers detects the phase difference between the PSK signals multiplied by 2 and the reference carriers multiplied by 2. A third phase detector coupled to a second multiplier of each of the first and second pluralities of multipliers detects the phase difference between the PSK signals multiplied by 4 and the reference carriers multiplied by 4. An $n^{th}$ phase detector coupled to an $n-1^{th}$ multiplier of each of the first and second pluralities of multipliers detects the phase difference between the PSK signals multiplied by $2^{n-1}$ and the reference carriers multiplied by $2^{n-1}$. A plurality of output means each coupled to a corresponding one of the phase detectors provides the detected output signals.

Each multiplier of each of the first and second groups of multipliers comprises a frequency doubler.

Each of a first plurality of hybrids is coupled between a multiplier of the first plurality of multipliers and the next-succeeding multiplier of the first plurality of multipliers and a corresponding one of the phase detectors. A first of the first plurality of hybrids is connected between the first input means and the first multiplier of the first plurality of multipliers and the first phase detector. Each of a second plurality of hybrids is coupled between a multiplier of the second plurality of multipliers and the next-succeeding multiplier of the second plurality of multipliers and a corresponding one of the phase detectors. A first of the second plurality of hybrids is connected between the second input means and the first multiplier of the second plurality of multipliers and the first phase detector.

Each of a plurality of phase shifters is connected between a corresponding hybrid of the second plurality of hybrids and a corresponding one of the phase detectors.

Each of a plurality of bandpass filters is connected between a corresponding multiplier of each of the first and second pluralities of multipliers and a corresponding hybrid of each of the first and second pluralities of hybrids.

Each of a plurality of low pass filters is connected between a corresponding one of the phase detectors and a corresponding one of the output means.

In order that the invention may be readily carried into effect, it will now be described with reference to the accompanying drawings wherein.

Figure 3:
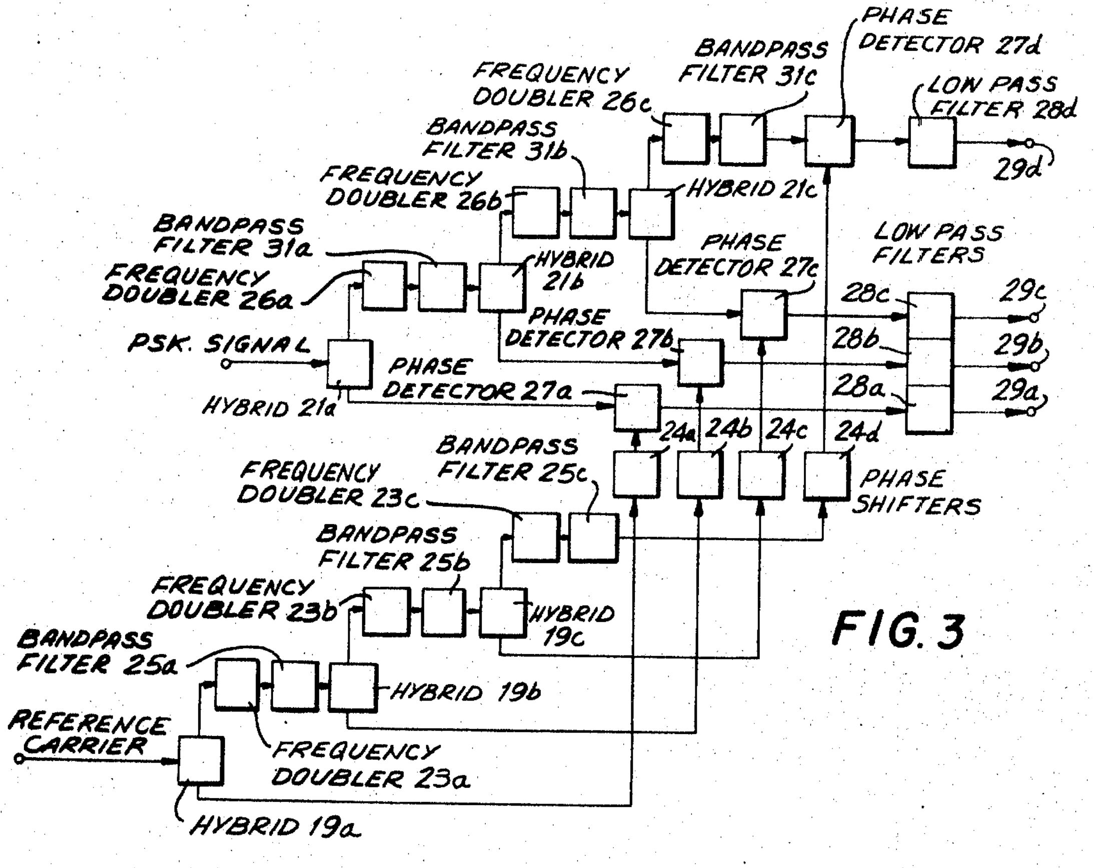
FIG. 3 is a block diagram of an embodiment of the synchronous detecting device of the invention.

FIGS. 4*a*, 4*b*, 4*c* and 4*d* are vector diagrams illustrating the operation of the synchronous detecting device of the invention; and FIGS. 5*a*, 5*b*, 5*c*, 5*d*, 5*e*, 5*f* and 5*g* together constitute a circuit diagram of the synchronous detecting device disclosed in FIG. 3.

In the FIGS., the same components are identified by the same reference numerals.

Figure 1:
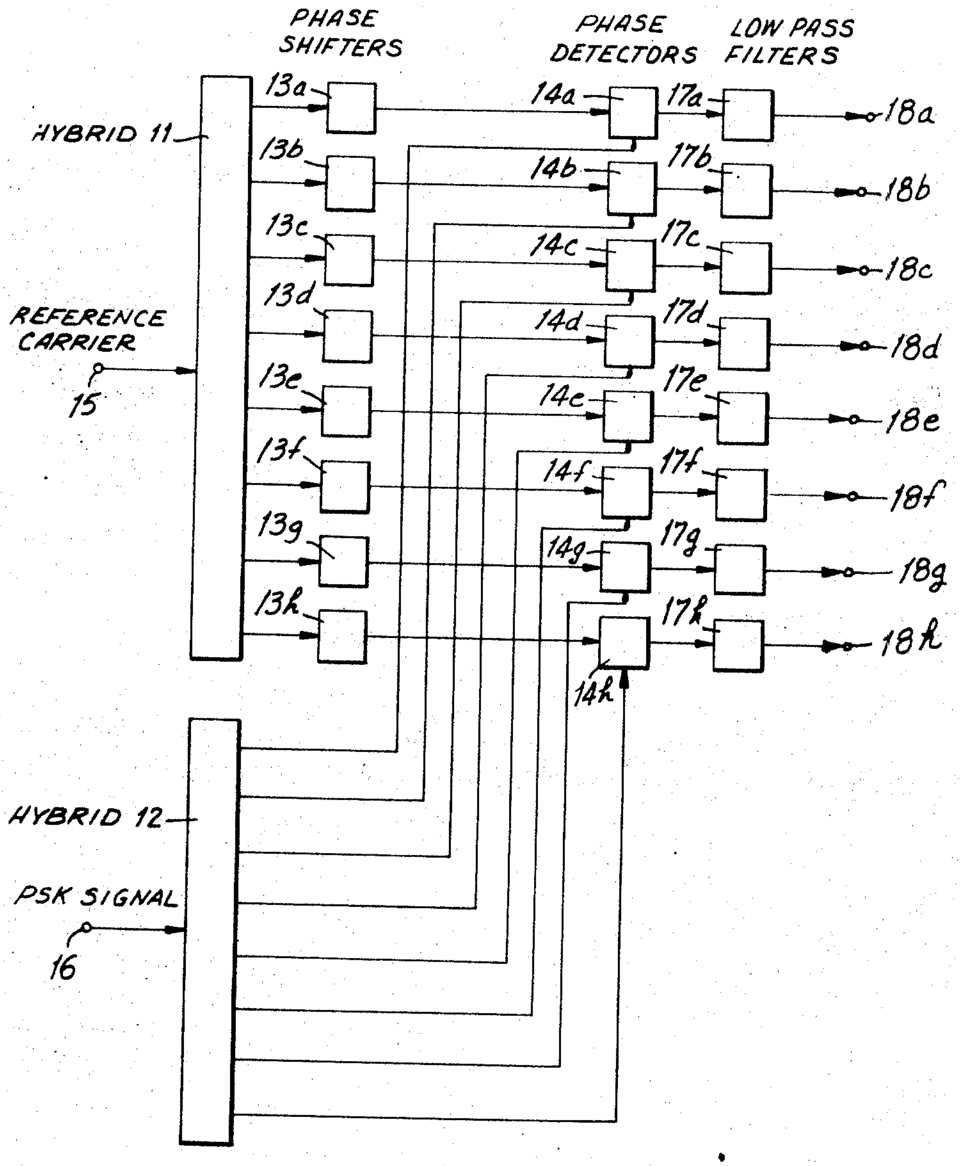
FIG. 1 PRIOR ART
FIG. 1 is a block diagram of a synchronous detecting device of known type.

FIG. 1 shows a synchronous detecting device of known type for a PSK polyphase wave. The synchronous detecting device of FIG. 1 may detect, for example, 16 phases. In FIG. 1, a reference carrier wave and a PSK wave are discriminated into eight series by a hybrid 11 and a hybrid 12, respectively. The hybrid 11 has eight outputs, each of which is connected to the input of a corresponding one of a plurality of eight phase shifters **13*a*, 13*b*, 13*c*, 13*d*, 13*e*, 13*f*, 13*g* and 13*h*. Each of the phase shifters 13*a* to 13*h* has an output connected to an input of a corresponding one of a plurality of eight phase detectors 14*a*, 14*b*, 14*c*, 14*d*, 14*e*, 14*f*, 14*g* and 14*h*. The hybrid 12 has a plurality of eight outputs, each of which is connected to another input of a corresponding one of the phase detectors 14*a* to 14*h*. The reference carrier wave is supplied to the input of the hybrid 11 via an input terminal 15. The PSK signal is supplied to the input of the hybrid 12 via an input terminal 16. The reference carrier wave is thus supplied from the hybrid 11 to the phase detectors 14***a* to 14*h* via the phase shifters 13*a* to 13*h* and the PSK wave is supplied from the hybrid 12 directly to said phase detectors.

Each of the phase detectors 14*a* to 14*h* has an output connected to the input of a corresponding one of a plurality of eight low pass filters 17*a*, 17*b*, 17*c*, 17*d*, 17*e*, 17*f*, 17*g* and 17*h*. Each of the low pass filters 17*a* to 17*h* has an output connected to a corresponding one of a plurality of eight output terminals 18*a*, 18*b*, 18*c*, 18*d*, 18*e*, 18*f*, 18*g* and 18*h*.

Figure 2:
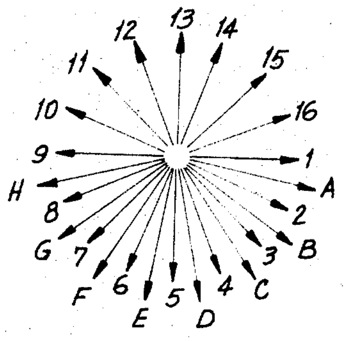
FIG. 2 is a vector diagram illustrating the operation of the synchronous detecting device of FIG. 1.

The conventional synchronous detecting device of FIG. 1 detects both the waves in each of the phase detectors 14*a* to 14*h* and provides outputs at the output terminals 18*a* to 18*h* by passing the detected outputs through the low pass filters 17*a* to 17*h*. If it is assumed that the vectors of 16 phases are 1 to 16, as shown in FIG. 2, then the reference carrier waves of which the phases are shifted by the phase shifters 13*a* to 13*h* of FIG. 1 are indicated by A, B, C, D, E, F, G and H in FIG. 2.

On the other hand, if the phase detectors 14*a* to 14*h* are set so that the relation between the phase difference $\theta$ of the input signals to said phase detectors and the detected output voltage EO may be $$EO \propto \cos\theta,$$

the output signals provided at the output terminals 18a to 18h may be those shown in Table I.

In Table I, the output signal is 1 when the detected output voltage EO is positive and the output signal is 0 when the detected output voltage EO is negative.

TABLE I

| PHASE | OUTPUT | | | | | | | |
|---|---|---|---|---|---|---|---|---|
| | 18*a* | 18*b* | 18*c* | 18*d* | 18*e* | 18*f* | 18*g* | 18*h* |
| 1 | 1 | 1 | 1 | 1 | 0 | 0 | 0 | 0 |
| 2 | 1 | 1 | 1 | 1 | 1 | 0 | 0 | 0 |
| 3 | 1 | 1 | 1 | 1 | 1 | 1 | 0 | 0 |
| 4 | 1 | 1 | 1 | 1 | 1 | 1 | 1 | 0 |
| 5 | 1 | 1 | 1 | 1 | 1 | 1 | 1 | 1 |
| 6 | 0 | 1 | 1 | 1 | 1 | 1 | 1 | 1 |
| 7 | 0 | 0 | 1 | 1 | 1 | 1 | 1 | 1 |
| 8 | 0 | 0 | 0 | 1 | 1 | 1 | 1 | 1 |
| 9 | 0 | 0 | 0 | 0 | 1 | 1 | 1 | 1 |
| 10 | 0 | 0 | 0 | 0 | 0 | 1 | 1 | 1 |
| 11 | 0 | 0 | 0 | 0 | 0 | 0 | 1 | 1 |
| 12 | 0 | 0 | 0 | 0 | 0 | 0 | 0 | 1 |
| 13 | 0 | 0 | 0 | 0 | 0 | 0 | 0 | 0 |
| 14 | 1 | 0 | 0 | 0 | 0 | 0 | 0 | 0 |
| 15 | 1 | 1 | 0 | 0 | 0 | 0 | 0 | 0 |
| 16 | 1 | 1 | 1 | 0 | 0 | 0 | 0 | 0 |

In order to discriminate 16 phases reference carrier waves must be utilized, the phase difference of which is adjusted by eight phase shifters 13*a* to 13*h*, so that eight output signals A to H are provided at the output terminals 18*a* to 18*h*. In the known synchronous detecting device of FIG. 1, $2^{n-1}$ phase shifters 13*a* to 13*h*, phase detectors 14*a* to 14*h* and low pass filters 17*a* to 17*h* are required to detect a PSK wave of $2^n$ phases. Consequently, $2^{n-1}$ outputs are provided.

The synchronous detecting device known in the art thus has the disadvantages that since outputs of $2^{n-1}$ bits are required to discriminate $2^n$ phases, the more phases to be discriminated, the greater the rapid increase in redundance and useless bits. Since $2^{n-1}$ outputs are provided, $2^{n-1}$ waveform reshaping circuits are required after the detection. Furthermore, since it is necessary to utilize a circuit for converting outputs from $2^{n-1}$ bits to $n$ bits, the output logic circuit is complicated.

FIG. 3 illustrates an embodiment of the synchronous detecting device of the invention. The synchronous detecting device of FIG. 3 detects a PSK wave of 16 phases. The reference carrier wave is supplied to the input of a hybrid 19*a* via an input terminal 20. The PSK signal is supplied to the input of a hybrid 21*a* via an input terminal 22. The hybrid 19*a* has one output connected to the input of a frequency doubler 23*a* and another output connected to the input of a phase shifter 24*a*. The output of the frequency doubler 23*a* is connected to the input of a bandpass filter 25*a*. The output of the bandpass filter 25*a* is connected to the input of a hybrid 19*b*.

The hybrid 19*b* has one output connected to the input of a frequency doubler 23*b* and another output connected to the input of a phase shifter 24*b*. The output of the frequency doubler 23*b* is connected to the input of a bandpass filter 25*b*. The output of the bandpass filter 25*b* is connected to the input of a hybrid 19*c*. The hybrid 19*c* has one output connected to the input of a frequency doubler 23*c* and another output connected to the input of a phase shifter 24*c*. The output of the frequency doubler 23*c* is connected to the input of a bandpass filter 25*c*. The output of the bandpass filter 25*c* is connected to the input of a phase shifter 24*d*.

The hybrid 21*a* has an output connected to the input of a frequency doubler 26*a* and another output connected to an input of a phase detector 27*a*. The phase shifter 24*a* has an output connected to the other input of the phase detector 27*a*. The output of the phase detector 27*a* is connected to the input of a low pass filter 28*a*. The output of the low pass filter 28*a* is connected to an output terminal 29*a*.

The output of the frequency doubler 26*a* is connected to the input of a bandpass filter 31*a*. The output of the bandpass filter 31*a* is connected to the input of a hybrid 21*b*. The hybrid 21*b* has one output connected to the input of a frequency doubler 26*b* and another output connected to an input of a phase detector 27*b*. The output of the phase shifter 24*b* is connected to the other input of the phase detector 27*b*. The output of the phase detector 27*b* is connected to the input of a low pass filter 28*b*. The output of the low pass filter 28*b* is connected to an output terminal 29*b*.

The output of the frequency doubler 26*b* is connected to the input of a bandpass filter 31*b*. The output of the bandpass filter 31*b* is connected to the input of a hybrid 21*c*. The hybrid 21*c* has one output connected to the input of a frequency doubler 26*c* and another output connected to the input of a phase detector 27*c*. The output of the phase shifter 24*c* is connected to the other input of the phase detector 27*c*. The output of the phase detector 27*c* is connected to the input of a low pass filter 28*c*. The output of the low pass filter 28*c* is connected to an output terminal 29*c*.

The output of the frequency doubler 26*c* is connected to the input of a bandpass filter 31*c*. The output of the bandpass filter 31*c* is connected to an input of a phase detector 27*d*. The output of the phase shifter 24*d* is connected to the other input of the phase detector 27*d*. The output of the phase detector 27*d* is connected to the input of a low pass filter 28*d*. The output of the low pass filter 28*d* is connected to an output terminal 29*d*.

Figure 4A:
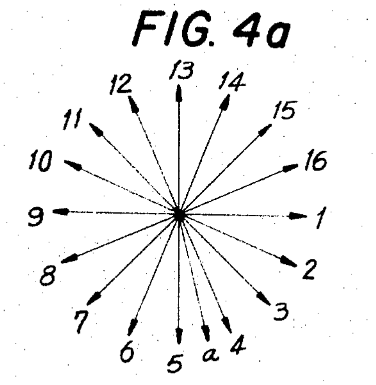

As indicated in FIG. 4*a*, the phases of a PSK 16 phase wave are numbered 1 to 16. Initially, when the PSK wave and the reference carrier wave are mixed by the phase detector 27*a* of FIG. 3, so that the vector *a* of the reference carrier wave (FIG. 4*a*) may be shifted between the phases 4 and 5 (FIG. 4*a*) by adjustment of the phase shifter 24*a*, the output signals *a* provided at the output terminal 29*a* are those indicated in Table II.

TABLE II

| PHASE | OUTPUT 29a | 29b | 29c | 29d |
|---|---|---|---|---|
| 1 | 1 | 1 | 1 | 1 |
| 2 | 1 | 1 | 1 | 0 |
| 3 | 1 | 1 | 0 | 1 |
| 4 | 1 | 1 | 0 | 0 |
| 5 | 1 | 0 | 1 | 1 |
| 6 | 1 | 0 | 1 | 0 |
| 7 | 1 | 0 | 0 | 1 |
| 8 | 1 | 0 | 0 | 0 |
| 9 | 0 | 1 | 1 | 1 |
| 10 | 0 | 1 | 1 | 0 |
| 11 | 0 | 1 | 0 | 1 |
| 12 | 0 | 1 | 0 | 0 |
| 13 | 0 | 0 | 1 | 1 |
| 14 | 0 | 0 | 1 | 0 |
| 15 | 0 | 0 | 0 | 1 |
| 16 | 0 | 0 | 0 | 0 |

In Table II, the output signal is 1 when the output voltage is positive and 0 when the output voltage is negative.

Figure 4B:
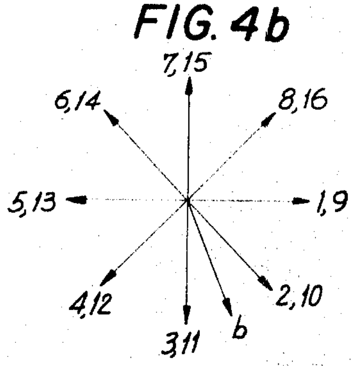

When the PSK 16 phase wave is multiplied by 2 by the frequency doubler 26*a*, said PSK wave degenerates to a PSK 8 phase wave, as shown in FIG. 4*b*. Similarly, when the reference carrier wave is supplied to the phase detector 27*b* and is multiplied by 2 by the frequency doubler 23*a*, and then shifted by the phase shifter 24*b* in order to provide the phase relationship shown by the vector *b* in FIG. 4*b*, the output signals *b* at the output terminal 29*b* are those indicated in Table II.

Figure 4C:
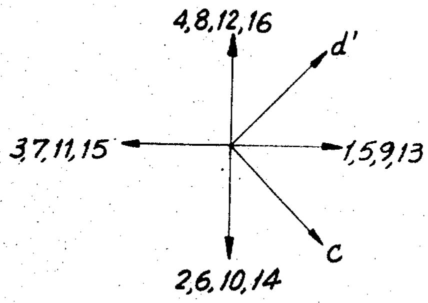

When the PSK 8 phase wave is multiplied by 2 by the frequency doubler 26*b*, it degenerates to a PSK 4 phase wave as shown in FIG. 4*c*. When the reference carrier wave is also multiplied by 2, after its initial multiplication, by the frequency doubler 23*b* and shifted in phase by the phase shifter 24*c*, in order to provide the phase relationship shown by the vector *c* in FIG. 4*c*, and is then supplied to the phase detector 27*c*, the output signals *c* provided at the output terminal 29*c* are those indicated in Table II.

Figure 4D:
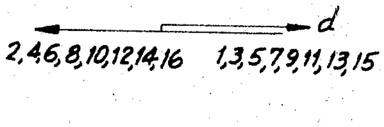

When the PSK 4 phase wave is multiplied by 2, after its initial multiplication, by the frequency doubler 26*c*, and the reference carrier wave is multiplied by 2, after its initial multiplication, by the frequency doubler 23*c*, and is shifted in phase by the phase shifter 24*d* to provide the phase relationship shown by the vector *d* in FIG. 4*d*, and is then supplied to the phase detector 27*d*, the output signals *d* provided at the output terminal 29*d*, are those indicated in Table II.

Thus, four outputs are provided for each phase and the discrimination of 16 phases is enabled by such outputs.

In the synchronous detecting device of the invention, n outputs may be provided for each phase of a PSK wave having $2^n$ phases. This is achieved by repeating multiplication by 2, as hereinbefore described, until the PSK wave has two phases. Thus, $2^n$ phases may be discriminated by *n* outputs. .Furthermore, a total of *n* outputs may be provided when synchronous detection is carried out by means of the reference carrier wave of the vectors *c* and *d*, as shown in FIG. 4*c*, when there are 4 phases after repetition of the multiplication by 2.

When the PSK wave has $2^n$ phases, therefore, $2^n$ phases may simply be discriminated by outputs of *n* bits, if multiplication is repeated up to four phases.

A circuit diagram for the embodiment of the synchronous detecting device of FIG. 3 is shown in FIGS. 5*a* to 5*g*, which should be taken together as a single circuit. The circuitry of FIGS. 5*a* to 5*g* is well known and is therefore not described in detail. In FIGS. 5*a* to 5*g*, the terminals AA to PP are internal connecting terminals which indicate the connections of the portions of the circuits of each of said FIGS. to form a single complete circuit.

Figure 5A:
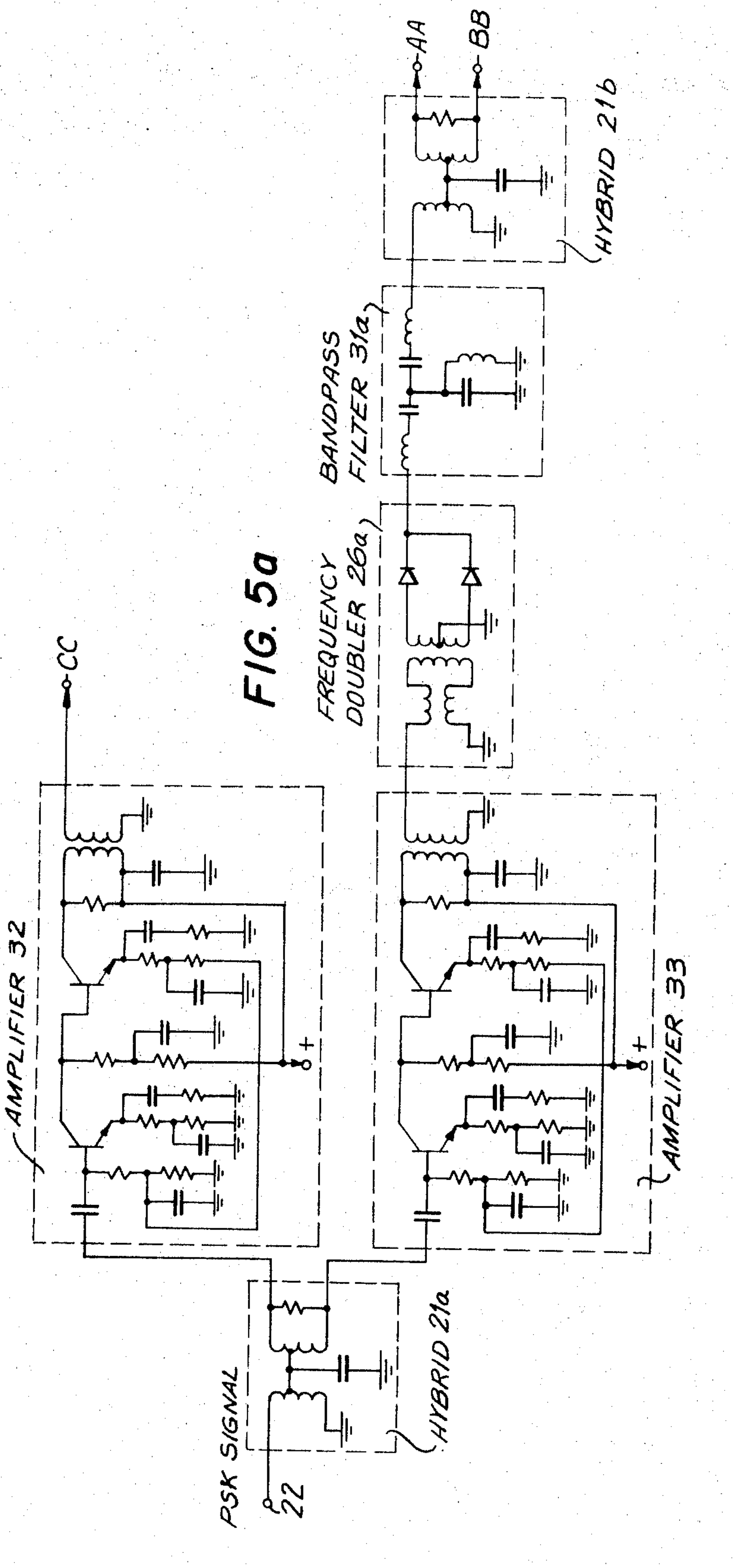
Figure 5B:
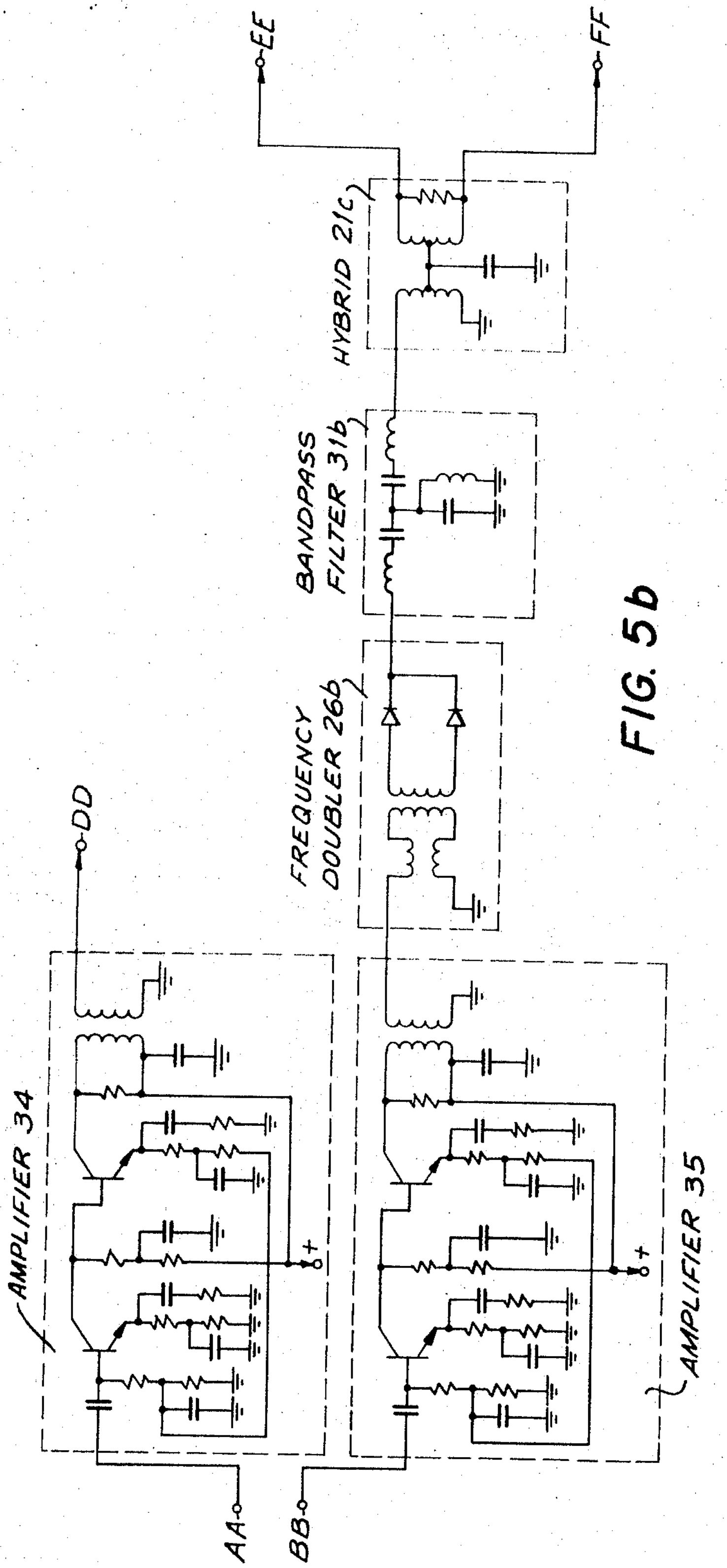
Figure 5C:
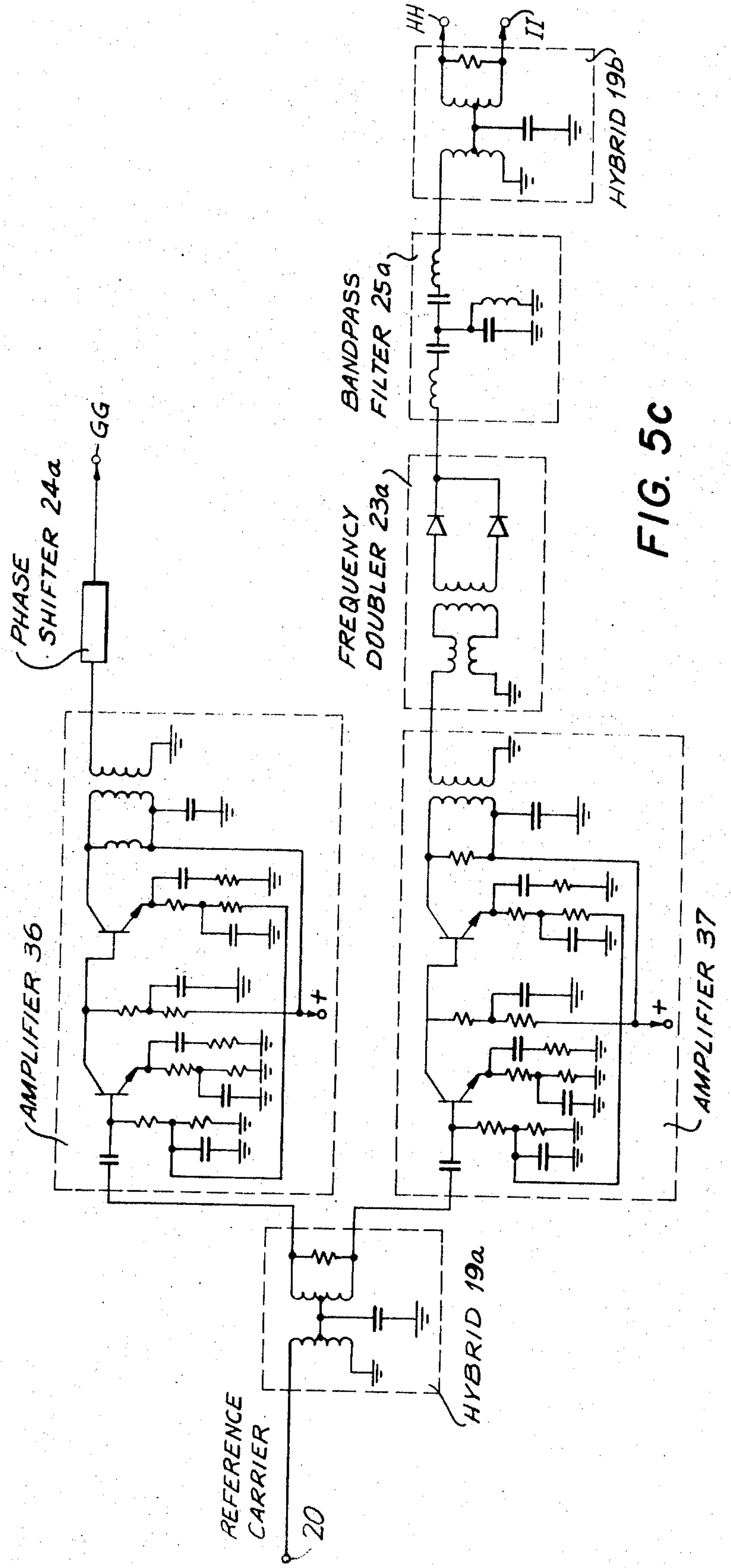
Figure 5D:
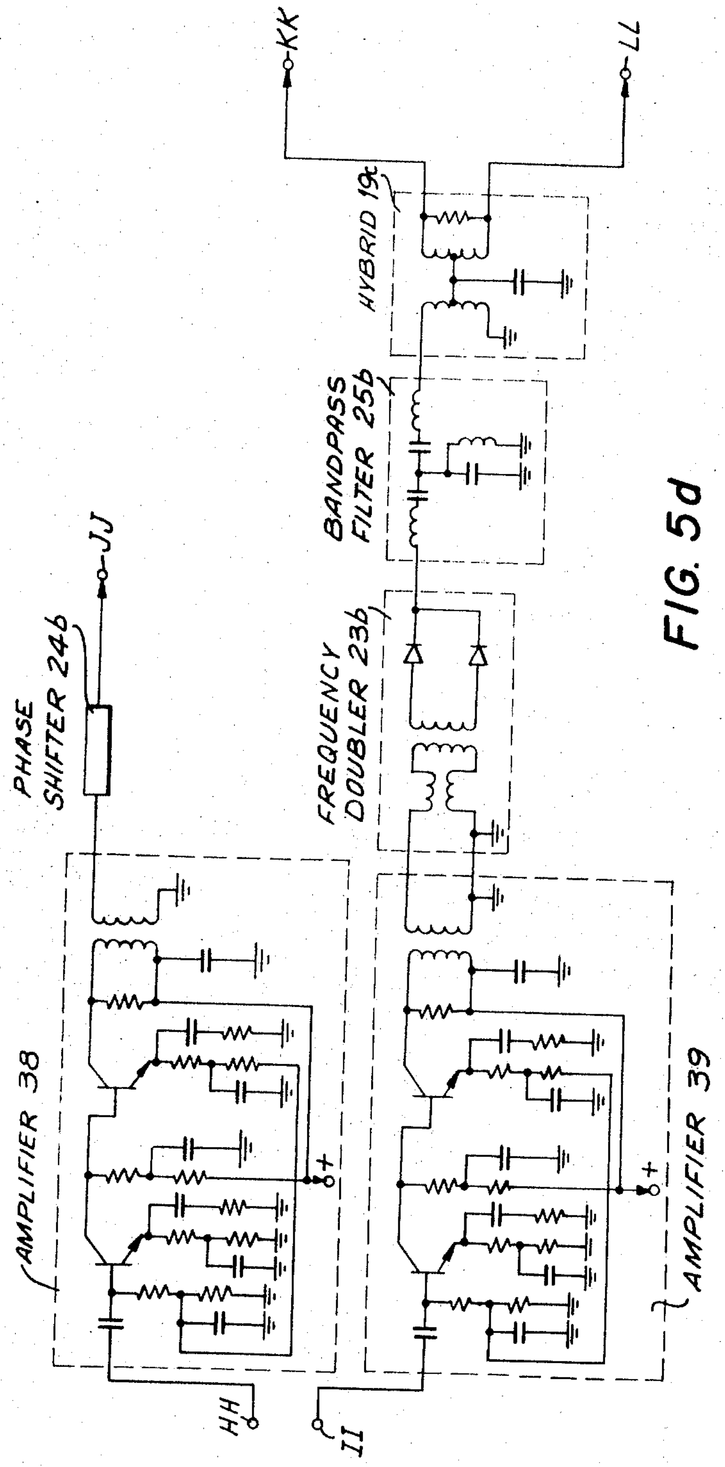
Figure 5E:
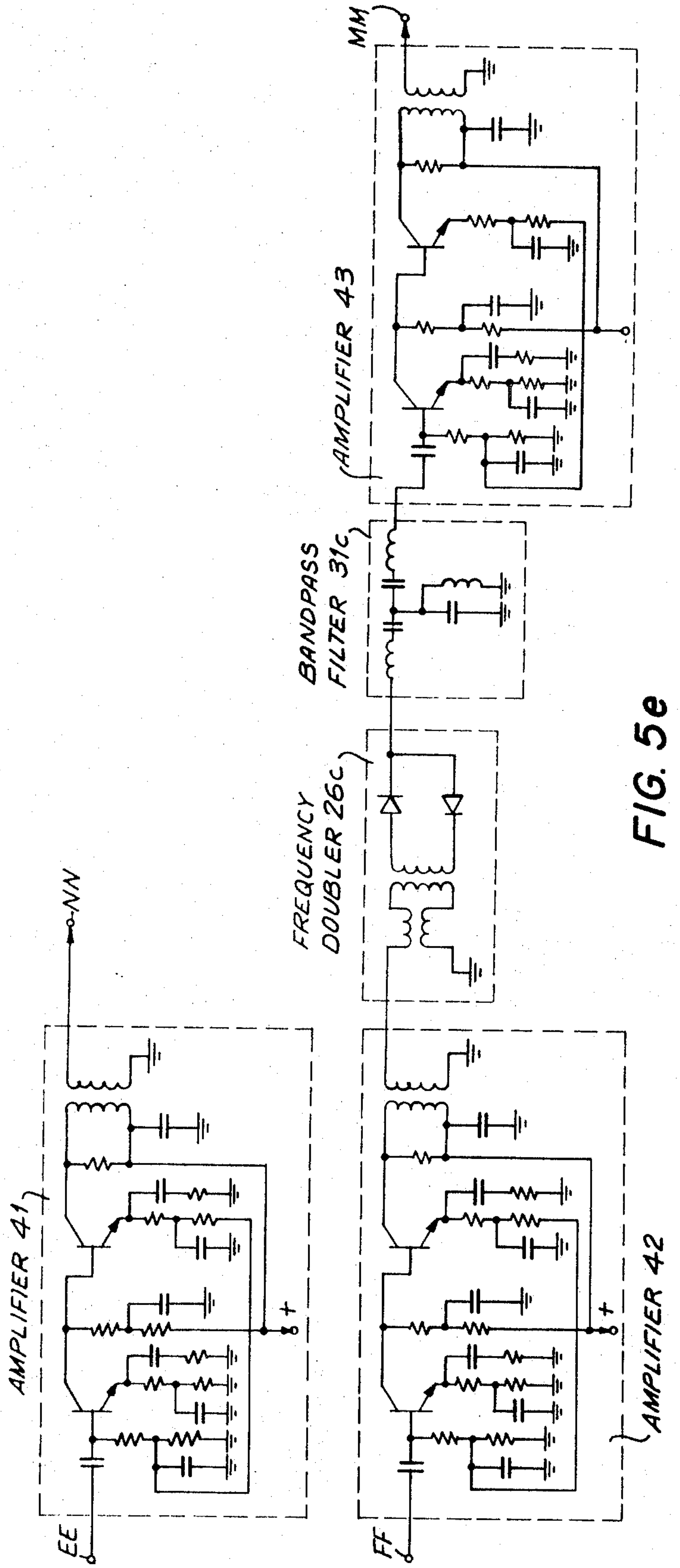
Figure 5F:
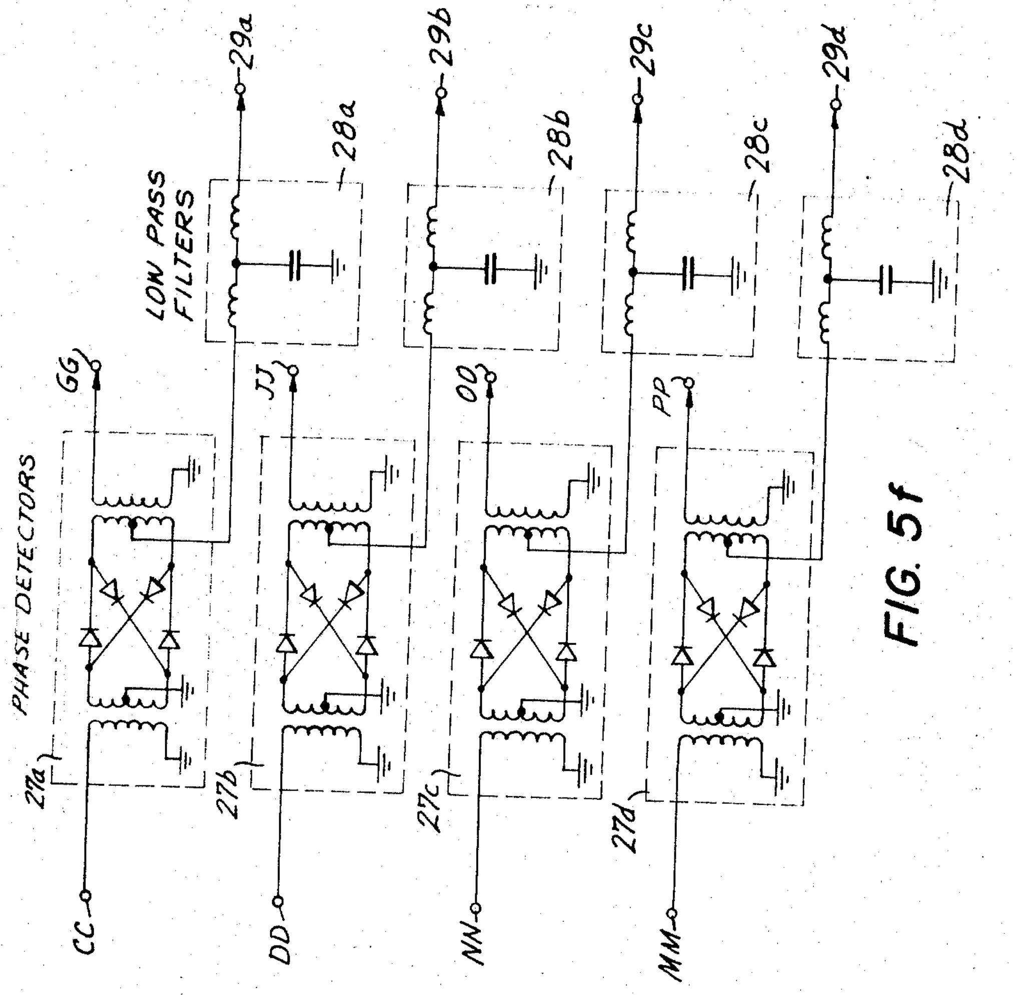
Figure 5G:
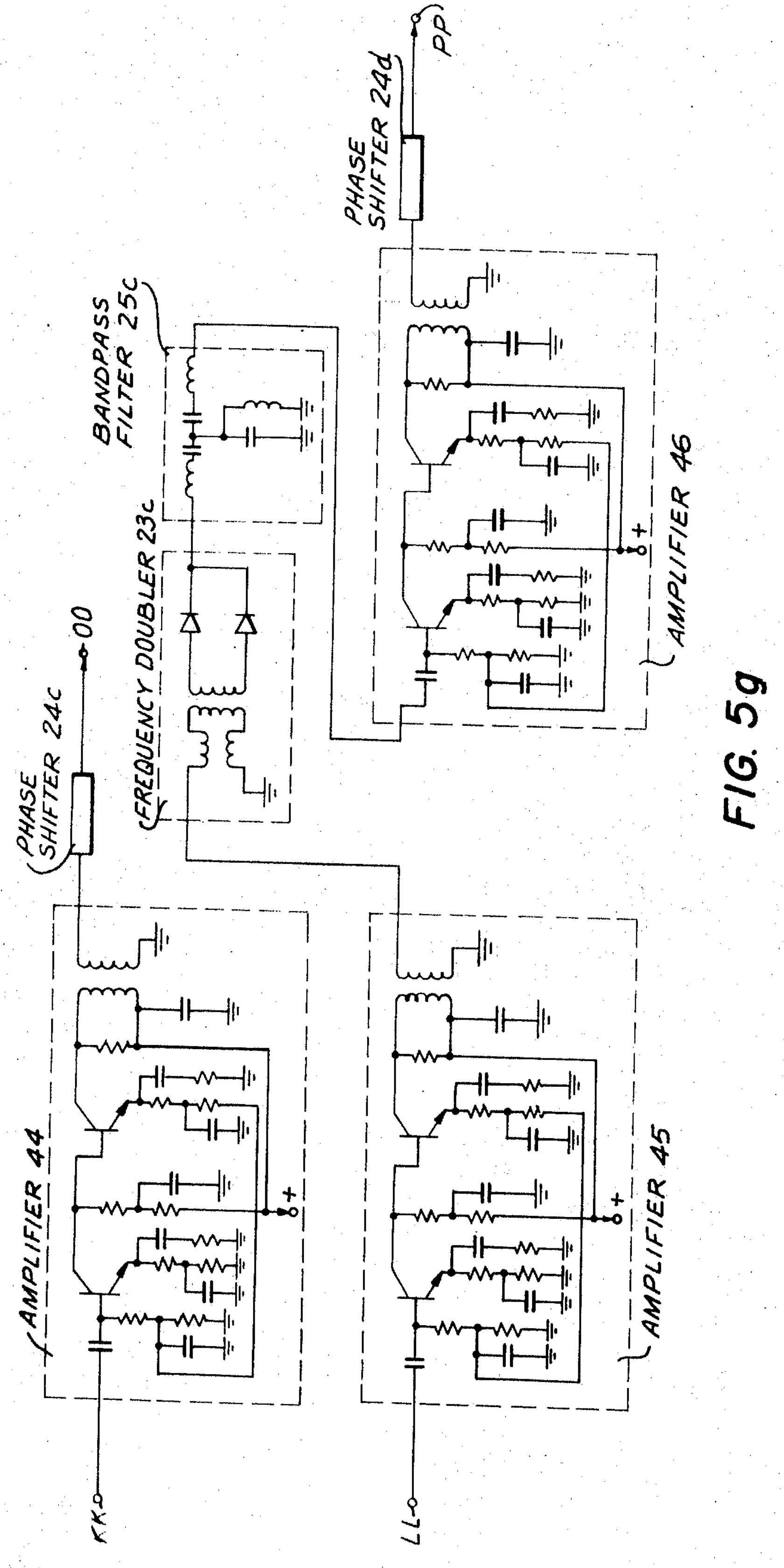

Each of the various stages of the circuit arrangement of FIGS. 5*a* to 5*g* includes amplifiers which constitute circuits well known in the art and which are utilized to maintain the PSK signals and the reference carriers at a necessary level. The amplifiers comprise a plurality of amplifiers 32, 33 (FIG. 5*a*), 34, 35 (FIG. 5*b*), 36, 37 (FIG. 5*c*), 38, 39 (FIG. 5*d*), 41, 42, 43 (FIG. 5*e*), 44, 45 and 46 (FIG. 5*g*).

The amplifiers 32 to 46 comprise well known two stage transistor amplifiers of common emitter type. These amplifiers have an excellent frequency characteristic and an excellent distortion characteristic for amplitude to phase conversion, and the like. Furthermore, the positive terminal of the power supply for the driving amplifiers, which is not shown in the FIGS., is connected to the + terminal.

The input signals to the hybrids 19*a*, 19*b*, 19*c*, 21*a*, 21*b* and 21*c* are supplied to the primary windings of the transformers of said hybrids, as shown in FIGS. 5*a*, 5*b*, 5*c* and 5*d*. The signals supplied to the hybrids are divided in the secondary winding of the transformers thereof and supplied to the following amplifier stage. Each of the hybrids comprises a well known circuit and has an excellent frequency characteristic against amplitude and phase fluctuations. Isolation between two terminals at the output of the secondary winding of the transformer of each bybrid is excellent. The hybrids 21*a*, 21*b* and 21*c* divide the PSK signals, whereas the hybrids 19*a*, 19*b* and 19*c* divide the reference carriers.

Each of the frequency doublers 23*a*, 23*b*, 23*c*, 26*a*, 26*b* and 26*c* is a well known circuit for multiplying the reference carriers and the PSK signals by 2. Each of the frequency doublers comprises a full wave rectifier utilizing two diodes. Furthermore, each of the frequency doublers comprises a transformer for balancing the signals to both diodes. The frequency doublers 23*a*, 23*b*, 23*c*, 26*a*, 26*b* and 26*c* have an excellent frequency characteristic in the desired frequency band utilized and have an excellent intermodulation characteristic and an excellent amplitude and phase conversion characteristic.

Each of the bandpass filters 25*a*, 25*b*, 25*c*, 31*a*, 31*b* and 31*c* is of known type and is utilized to reduce unnecessary spurious noise after the multiplication by the frequency doubler corresponding thereto. The bandpass filters comprise T type filters.

The phase shifters 24*a*, 24*b*, 24*c* and 24*d* are well known circuits and are utilized to adjust the reference carrier in a phase position shown in FIGS. 4*a*, 4*b*, 4*c* and 4*d*. A delay line is preferably utilized as each of the phase shifters. Therefore, in FIGS. 5*c*, 5*d* and 5*g*, each of the phase shifters is indicated as a delay line.

The phase detectors 27*a*, 27*b*, 27*c* and 27*d* constitute well known phase detector circuits. The phase detectors provide the phase difference between a PSK signal and a reference carrier as the change in the amplitude of the output voltage. That is, when the phase difference is $\theta$, a voltage proportional the cos $\theta$ is produced. The phase detectors 27*a*, 27*b*, 27*c* and 27*d*, as shown in FIG. 5f, each comprise 4 diodes. The frequency characteristic and carrier suppression characteristic of each of the phase detectors is excellent.

The low pass filters 28*a*, 28*b*, 28*c* and 28*d* are well known filter circuits. Each of the low pass filters removes the low frequency part, which is the base band component, from the outputs of the corresponding phase detectors 27*a*, 27*b*, 27*c* and 27*d* and feeds said low frequency part to the corresponding one of the output terminals 29*a*, 29*b*, 29*c* and 29*d*. T type filters are utilized as the low pass filters.

As hereinbefore described, the synchronous detecting device of the invention permits the discrimination of a PSK wave having $2^n$ phases by the absolute minimum number of outputs of n bits. Therefore, the output logic circuit is of simple structure. Although the same number of bandpass filters as the number of frequency doublers is necessary, in accordance with the invention, the number of required phase shifters, phase detectors and low pass filters is decreased relative to known synchronous detecting devices. Furthermore, there are fewer phase adjusting positions, and independent adjustment of the phase positions is feasible. Phase adjustment is thus considerably simplified. Since the number of output terminals is small, the waveform reshaping circuits after detection are reduced in accordance with the number of outputs, so that a considerable simplification of the overall circuitry is provided in comparison with known or conventional synchronous detecting devices.

While the invention has been described by means of a specific example and in a specific embodiment, we do not wish to be limited thereto, for obvious modifications will occur to those skilled in the art without departing from the spirit and scope of the invention.

We claim:

1. A synchronous detecting device, comprising first input means for supplying PSK polyphase signals; second input means for supplying reference carriers; a first plurality of frequency doublers coupled in series to the first input means for multiplying the PSK signals in sequence by 2; a second plurality of frequency doublers coupled in series to the second input means for multiplying the reference carriers in sequence by 2, the total number of doublers being equal to $n-1$, the number of doublers in each of the first and second pluralities of doublers being equal and each doubler multiplying an input signal by 2; a first phase detector coupled to the first and second input means for detecting the phase difference between the PSK signals and the reference carriers; a second phase detector coupled to a first doubler of each of the first and second pluralities of doublers for detecting the phase difference between the PSK signals multiplied by 2 and the reference carriers multiplied by 2; a third phase detector coupled to a second doubler of each of the first and second pluralities of doublers for detecting the phase difference between the PSK signals multiplied by 4 and the reference carriers multiplied by 4; an $n^{th}$ phase detector coupled to an $n-1^{th}$ doubler of each of the first and second pluralities of doublers for detecting the phase difference between the PSK signals multiplied by $2^{n-1}$ and the reference carriers multiplied by $2^{n-1}$; a plurality of output means each coupled to a corresponding one of the phase detectors for providing the detected output signals.

2. A synchronous detecting device as claimed in claim 1, further comprising a first plurality of hybrids each coupled between a doubler of the first plurality of frequency doublers and the next-succeeding doubler of the first plurality of frequency doublers and a corresponding one of the phase detectors, a first of the first plurality of hybrids being connected between the first input means and the first doubler of the first plurality of doublers and the first phase detector, and a second plurality of hybrids each coupled between a doubler of the second plurality of frequency doublers and the next-succeeding doubler of the second plurality of doublers and a corresponding one of the phase detectors, a first of the second plurality of hybrids being connected between the second input means and the first doubler of the second plurality of doublers and the first phase detector.

3. A synchronous detecting device as claimed in claim 2, further comprising a plurality of phase shifters each connected between a corresponding hybrid of the second plurality of hybrids and a corresponding one of the phase detectors.

4. A synchronous detecting device as claimed in claim 3, further comprising a plurality of bandpass filters each connected between a corresponding doubler of each of the first and second pluralities of doublers and a corresponding hybrid of each of the first and second pluralities of hybrids.

5. A synchronous detecting device as claimed in claim 4, further comprising a plurality of low pass filters each connected between a corresponding one of the phase detectors and a corresponding one of the output means.

* * * * *